United States Patent [19]
Tunney et al.

[11] Patent Number: 5,994,024
[45] Date of Patent: Nov. 30, 1999

[54] METHOD FOR APPLYING A LAMINATE ON A LASER ABLATIVE RECORDING ELEMENT

[75] Inventors: Scott E. Tunney, Ontario; Stephen M. Neumann, Rochester, both of N.Y.

[73] Assignee: Eastman Kodak Company, Rochester, N.Y.

[21] Appl. No.: 09/026,827

[22] Filed: Feb. 20, 1998

[51] Int. Cl.$^6$ ...................................................... B32B 31/20
[52] U.S. Cl. .......................... 430/200; 430/201; 430/945; 430/259; 156/272.2
[58] Field of Search ..................................... 430/200, 201, 430/945, 259; 156/272.2

[56] References Cited

U.S. PATENT DOCUMENTS

| | | | |
|---|---|---|---|
| 4,334,006 | 6/1982 | Kitijima et al. | 430/254 |
| 5,372,985 | 12/1994 | Chang et al. | 503/227 |
| 5,429,909 | 7/1995 | Kaszczuk et al. | 430/273.1 |
| 5,582,669 | 12/1996 | Gove et al. | 156/239 |
| 5,674,658 | 10/1997 | Buberry et al. | 430/252 |
| 5,677,106 | 10/1997 | Burberry et al. | 430/253 |

*Primary Examiner*—Martin Angebranndt
*Attorney, Agent, or Firm*—Harold E. Cole

[57] ABSTRACT

A process of forming a protective laminate to a laser-ablative recording element comprising a support having thereon an image layer comprising a colorant dispersed in a polymeric binder, the colorant layer having an infrared-absorbing material associated therewith, wherein the element is subjected to a corona discharge treatment prior to application of the protective laminate.

4 Claims, No Drawings

METHOD FOR APPLYING A LAMINATE ON A LASER ABLATIVE RECORDING ELEMENT

FIELD OF THE INVENTION

This invention relates to a method for applying a protective laminate on a laser ablative recording element which has good adhesion.

BACKGROUND OF THE INVENTION

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to one of the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726A, the disclosure of which is hereby incorporated by reference.

In one ablative mode of imaging by the action of a laser beam, an element with a dye layer composition comprising an image dye, an infrared-absorbing material, and a binder coated onto a substrate is imaged from the dye side. The energy provided by the laser drives off substantially all of the image dye and binder at the spot where the laser beam hits the element. In ablative imaging, the laser radiation causes rapid local changes in the imaging layer thereby causing the material to be ejected from the layer. Ablation imaging is distinguishable from other material transfer techniques in that some sort of chemical change (e.g., bond-breaking), rather than a completely physical change (e.g., melting, evaporation or sublimation), causes an almost complete transfer of the image dye rather than a partial transfer. The transmission Dmin density value serves as a measure of the completeness of image dye removal by the laser.

Imaged graphic arts films, such as Kodak's Direct Image® Recording Film 1401 based on laser-ablative dye removal, are sensitive to abrasion and scratch formation during handling of the medium. The prior art has resorted to the application of carefully formulated overcoats to address these problems.

DESCRIPTION OF RELATED ART

U.S. Pat. No. 5,429,909 relates to a laser dye removal element containing an overcoat layer which is applied prior to imaging. There is a problem with using such an overcoat layer, however, in that overcoats which are thick enough to protect the element require high exposures during ablative imaging, while thin overcoats that image more efficiently are inadequate for protection. Further, since the overcoat is removed during imaging, the imaged area is left unprotected.

It is an object of this invention to provide a method for applying a protective laminate rather than an overcoat to protect both imaged and unimaged areas of the element. It is another object of the invention to provide a method for applying a protective laminate to a recording element while reducing the energy required during imaging. It is still another object of the invention to provide a method for applying a protective laminate which has improved adhesion between the imaged recording element and the laminate.

SUMMARY OF THE INVENTION

These and other objects are achieved in accordance with the invention which comprises a process of forming a protective laminate to a laser-ablative recording element comprising a support having thereon an image layer comprising a colorant dispersed in a polymeric binder, the colorant layer having an infrared-absorbing material associated therewith, wherein the element is subjected to a corona discharge treatment prior to application of the protective laminate.

It has been found that a corona discharge treatment (CDT) of the recording element, before application of a protective laminate, greatly enhances adhesion and results in secure application of the laminate to the recording element, thereby rendering the recording element scratch- and abrasion-resistant.

DESCRIPTION OF THE PREFERRED EMBODIMENTS

The protective laminate employed in the process of the invention may be any polymeric material which will provide abrasion and scratch resistance for the recording element. In one embodiment of the invention, the protective laminate may have an adhesive thereon which is superposed on the CDT-treated, imaged recording element and heat and/or pressure is applied thereto to cause the laminate to adhere to the recording element. In another embodiment of the invention, the laminate layer may be applied from a carrier sheet and its backing substrate is then peeled off the recording element leaving the protective laminate layer thereon.

Laminates which may be employed in the invention include the following:

Laminate L-1 comprising 4.30 g/m² Bostik® 7962 (polyester from Emhart Corp.) and 0.0027 g/m² Fluorad FC-431® applied to a poly(ethylene terephthalate) support.

Laminate L-2 comprising 2.15 g/m² Bostik® 7962 and 0.0027 g/m² Fluorad FC-431® applied to a poly(ethylene terephthalate) support.

Laminate L-3 comprising Transilwrap T-Kote® (a 43 µm clear polyester with MR adhesive available from Transilwrap Co., Inc., Cleveland, Ohio).

The ablation elements obtained by the process of this invention can be used to obtain medical images, reprographic masks, printing masks, etc. The image obtained can be a positive or a negative image.

The process of the invention is especially useful in making reprographic masks which are used in publishing and in the generation of printed circuit boards. The masks are placed over a photosensitive material, such as a printing plate, and exposed to a light source. The photosensitive material usually is activated only by certain wavelengths. For example, the photosensitive material can be a polymer which is crosslinked or hardened upon exposure to ultraviolet or blue light but is not affected by red or green light. For these photosensitive materials, the mask, which is used to block light during exposure, must absorb all wavelengths which activate the photosensitive material in the Dmax regions and absorb little in the Dmin regions. For printing plates, it is therefore important that the mask have high UV Dmax. If it does not do this, the printing plate would not be developable to give regions which take up ink and regions which do not.

Any polymeric material may be used as the binder in the recording element employed in the process of the invention. For example, there may be used cellulosic derivatives, e.g., cellulose nitrate, cellulose acetate hydrogen phthalate, cellulose acetate, cellulose acetate propionate, cellulose acetate butyrate, cellulose triacetate, a hydroxypropyl cellulose ether, an ethyl cellulose ether, etc., polycarbonates; polyurethanes; polyesters; poly(vinyl acetate); poly(vinyl halides) such as poly(vinyl chloride) and poly(vinyl chloride) copolymers; poly(vinyl ethers); maleic anhydride copolymers; polystyrene; poly(styrene-co-acrylonitrile); a polysulfone; a poly(phenylene oxide); a poly(ethylene oxide); a poly(vinyl alcohol-co-acetal) such as poly(vinyl acetal), poly(vinyl alcohol-co-butyral) or poly(vinyl benzal); or mixtures or copolymers thereof. The binder may be used at a coverage of from about 0.1 to about 5 g/m².

In a preferred embodiment, the polymeric binder used in the recording element employed in process of the invention has a polystyrene equivalent molecular weight of at least 100,000 as measured by size exclusion chromatography, as described in U.S. Pat. No. 5,330,876.

To obtain a laser-induced, ablative image using the process of the invention, a diode laser is preferably employed since it offers substantial advantages in terms of its small size, low cost, stability, reliability, ruggedness, and ease of modulation. In practice, before any laser can be used to heat an ablative recording element, the element must contain an infrared-absorbing material, such as pigments like carbon black, or cyanine infrared-absorbing dyes as described in U.S. Pat. No. 4,973,572, or other materials as described in the following U.S. Pat. Nos.: 4,948,777; 4,950,640; 4,950,639; 4,948,776; 4,948,778; 4,942,141; 4,952,552; 5,036,040; and 4,912,083, the disclosures of which are hereby incorporated by reference. The laser radiation is then absorbed into the colorant layer and converted to heat by a molecular process known as internal conversion. Thus, the construction of a useful colorant layer will depend not only on the hue, transferability and intensity of the colorant, but also on the ability of the colorant layer to absorb the radiation and convert it to heat. The infrared-absorbing material or dye may be contained in the colorant layer itself or in a separate layer associated therewith, i.e., above or below the colorant layer. As noted above, the laser exposure in the process of the invention takes place through the colorant side of the ablative recording element, which enables this process to be a single-sheet process, i.e., a separate receiving element is not required.

Lasers which can be used in the invention are available commercially. There can be employed, for example, Laser Model SDL-2420-H2 from Spectra Diode Labs, or Laser Model SLD 304 V/W from Sony Corp.

Any colorant can be used in the ablative recording element employed in the process of the invention provided it can be ablated by the action of the laser. Especially good results have been obtained with dyes such as disclosed in U.S. Pat. Nos. 4,541,830; 4,698,651; 4,695,287; 4,701,439; 4,757,046; 4,743,582; 4,769,360; and 4,753,922, the disclosures of which are hereby incorporated by reference. The above dyes may be employed singly or in combination. The dyes may be used at a coverage of from about 0.05 to about 1 g/m² and are preferably hydrophobic.

Pigments may also be used in the colorant layer of the ablative recording layer employed in the process of the invention such as carbon black, graphite, metal phthalocyanines, etc. When a pigment is used in the colorant layer, it may also function as the infrared-absorbing material, so that a separate infrared-absorbing material does not have to be used.

The colorant layer of the ablative recording element employed in the process of the invention may be coated on the support or printed thereon by a printing technique such as a gravure process.

Any material can be used as the support for the ablative recording element employed in the process of the invention provided it is dimensionally stable and can withstand the heat of the laser. Such materials include polyesters such as poly(ethylene naphthalate); poly(ethylene terephthalate); polyamides; polycarbonates; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide-amides and polyetherimides. The support generally has a thickness of from about 5 to about 200 µm. In a preferred embodiment, the support is transparent.

The following examples are provided to illustrate the invention.

EXAMPLES

The following materials were employed in this example:

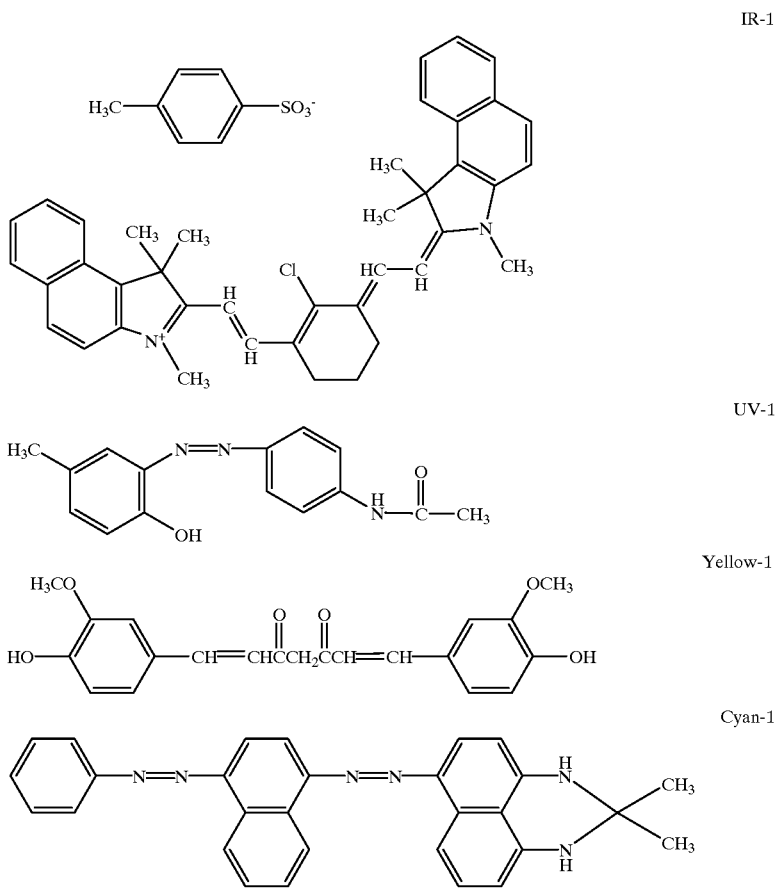

Laser-ablatable imaging elements were prepared by coating a barrier layer and an imaging layer, in that order, onto a 100 μm poly(ethylene terephthalate) support as follows:

| Layer | Material | g/m² |
|---|---|---|
| Barrier Layer | polycyanoacrylate* | 0.38 |
| | IR-1 | 0.054 |
| | Fluorad FC 431 ® (fluorosurfactant from 3M Corp.) | 0.0048 |
| Imaging Layer | nitrocellulose** | 0.435 |
| | IR-1 | 0.167 |
| | UV-1 | 0.344 |
| | Yellow-1 | 0.135 |
| | Cyan-1 | 0.237 |

*a mixture of 70% methyl and 30% ethyl esters was used
**available from Aqualon as 1000–1500 sec RS nitrocellulose

Example 1

A sample of the above imaging element was exposed to a corona generated by a Model LM2458-1 CDT unit manufactured by Enercon Industries Corp., which had a 1.5 Kw output. This unit has two pairs of electrodes 0.254 m long. The element was transported through the unit at a speed of 6.1 m/min. Three elements so treated were each laminated with L-1, L-2 and L-3 identified above. Control elements were prepared and laminated which were not CDT-treated.

Subsequently, the peel strength for removing each laminate from the recording element was measured using a digital force meter at a peel rate of 2.5 cm/sec and compared to untreated controls. The following results were obtained:

TABLE 1

Peel Strength in Newton for Laminate/Element Separation

| Laminate | Untreated Element (Control) | Element with CDT Treatment | Improvement in Peel Strength |
|---|---|---|---|
| L-1 | 0.9 | 5.8 | 4.9 |
| L-2 | 1.0 | 6.9 | 5.9 |
| L-3 | 20.9 | 42.9 | 22.1 |

The above results show that the CDT treatment increased the peel strength with all three laminates of the invention as compared to the untreated controls.

Examples 2 and 3

A source of ionic charge and an active chemical species (ozone) were used in a scorotron device (charger with a grid) connected to variable high-voltage DC power supply. The element was placed onto a flat movable hand-held platen, and a constant vacuum was used to retain it. This platen was made of aluminum and was electrically grounded during the treatment.

The scorotron device consisted of three main components: a metal-grounded backplate, multiple parallel tungsten (0.01 cm diameter) corona generation wires, and a metal screen which was used as a control grid. The movable sample holder was placed under the scorotron assembly such that the sample surface was held face up below and parallel to this control screen. The spacing from the sample to the screen was approximately 1–3 mm. The corona generating wires were approximately 1 cm. apart from each other and arranged in a plane. This plane was held approximately 1 cm. above the screen grid and approximately 1 cm. below the backplate. The corona wires were activated by connecting all of them to a High Voltage DC power supply and applying 4–9 kV relative to the grounded backplate. The control screen was also connected to another variable power supply such that 0–1000 volt DC could be applied to it. The control grid was biased to the same polarity as the corona wires. With the scorotron activated, the sample was manually moved back and forth for a period of time to promote uniform charging and/or exposure to chemical species.

The elements were treated with either a positive or a negative corona for 1 min. The samples were laminated with the three laminates identified in Table 2 at 280° C. Control elements were prepared and laminated which were not CDT-treated. The peak peel strength was measured as described above. The following results were obtained:

TABLE 2

Peel Strength in Newton for Laminate/Element Separation

| Laminate | No CDT (Control) | Positive Corona | Improvement in Peel Strength | Negative Corona | Improvement in Peel Strength |
|---|---|---|---|---|---|
| L-1 | 18.1 | — | — | 19.3 | 1.2 |
| L-2 | 12.8 | 10.5* | * | 11.3* | * |
| L-3 | 8.1 | 12.5 | 4.3 | 0.7 | 1.6 |

*laminate tore

The above results show that treatment with a positive or a negative corona increases the peel strength of L-3. The CDT treatment also increased the L-2 laminate peel strength as indicated by the polyester laminate support tearing on the treated samples. The L-1 laminate showed improvement with negative corona treatment.

The invention has been described in detail with particular reference to preferred embodiments thereof, but it will be understood that variations and modifications can be effected within the spirit and scope of the invention.

What is claimed is:

1. A process of applying a protective laminate to an imaged laser-ablative recording element comprising a support having thereon an image layer comprising a colorant dispersed in a polymeric binder, said image layer having an infrared-absorbing material associated therewith, wherein said image layer of said laser-ablative recording element is subjected to a corona discharge treatment prior to application of said protective laminate.

2. The process of claim 1 wherein said infrared-absorbing material is a dye which is contained in said image layer.

3. The process of claim 1 wherein said infrared-absorbing material is a pigment which is contained in said image layer.

4. The process of claim 1 wherein said protective laminate has an adhesive thereon which is superposed on the corona discharged-treated, imaged recording element and heat and/or pressure is applied thereto to cause the laminate to adhere to said recording element.

* * * * *